April 14, 1964  C. P. HUTCHISON ETAL  3,129,014
FUEL CELLS AND MANUFACTURE THEREOF
Filed Oct. 6, 1960  3 Sheets-Sheet 1
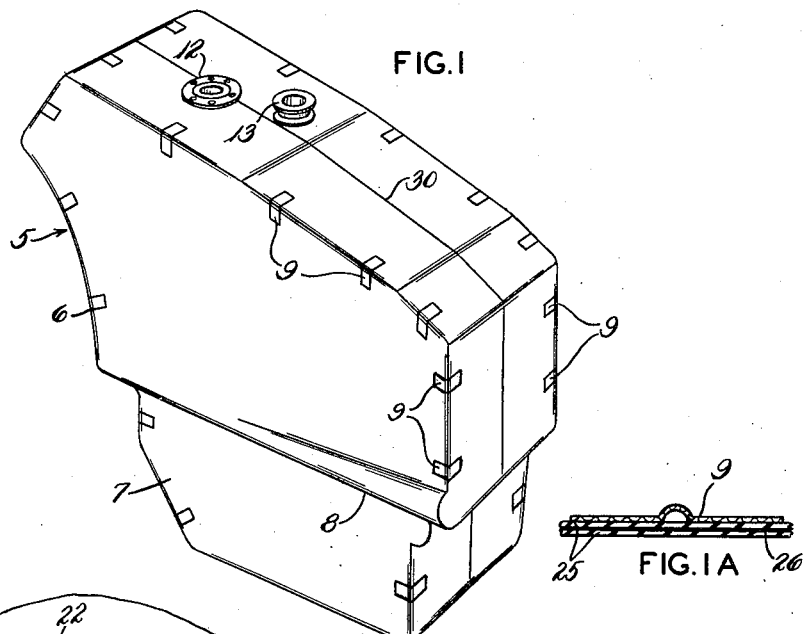
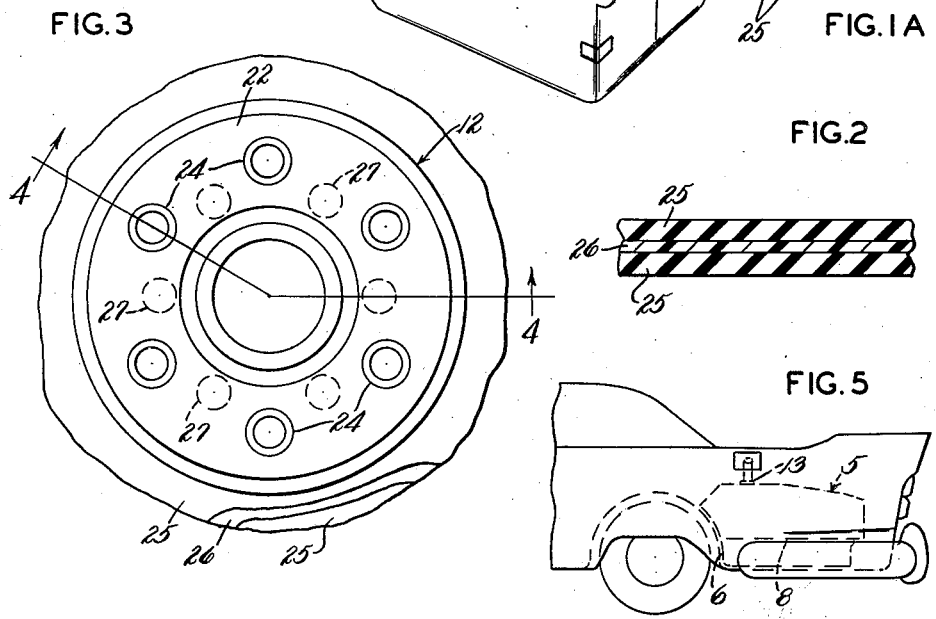
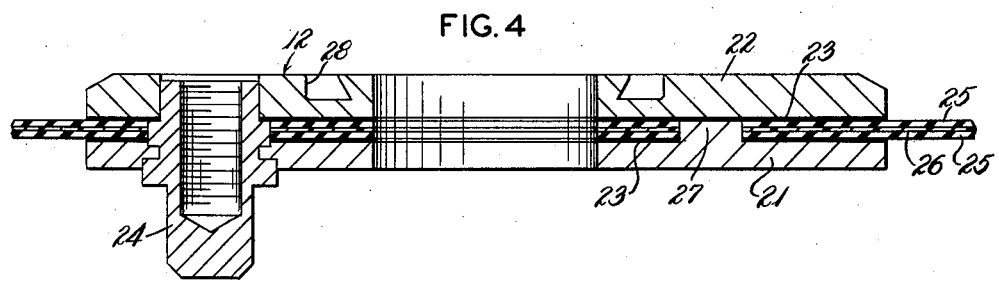

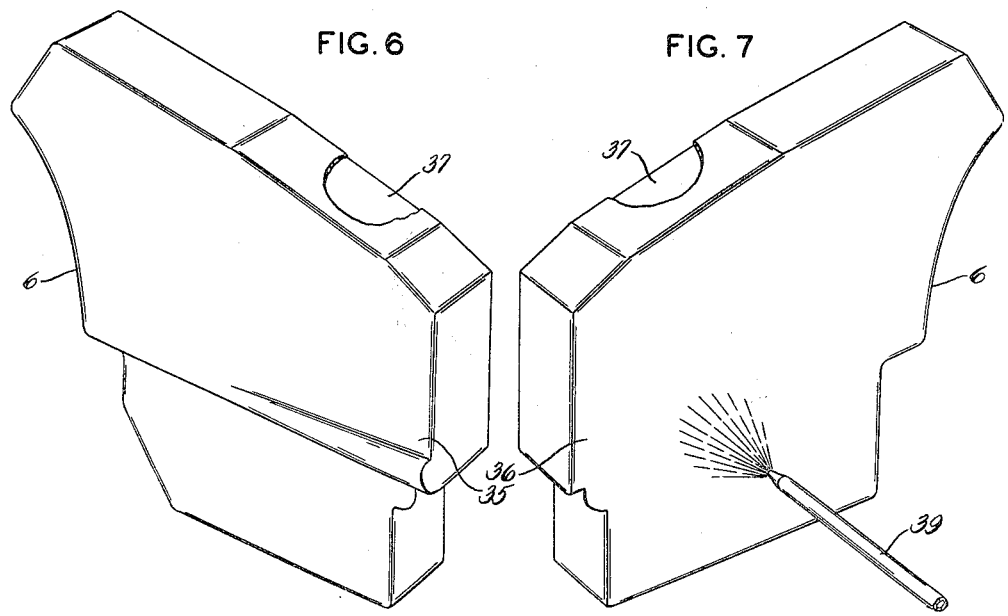
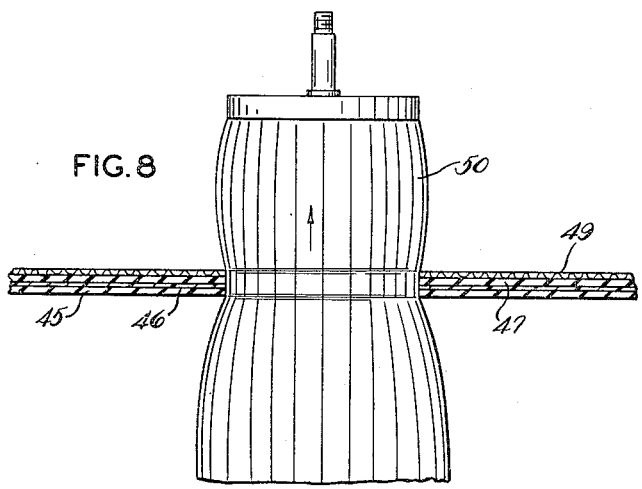

United States Patent Office 3,129,014
Patented Apr. 14, 1964

3,129,014
FUEL CELLS AND MANUFACTURE THEREOF
Cyril Paul Hutchison, Fullerton, and John L. Eberly, Garden Grove, Calif., assignors to The Firestone Tire & Rubber Company, Akron, Ohio, a corporation of Ohio
Filed Oct. 6, 1960, Ser. No. 60,975
10 Claims. (Cl. 280—5)

This invention relates to polyurethane fuel cells. The cells are advantageously manufactured largely or entirely (except for the fittings) from a liquid and are so cheap that they can replace metal fuel tanks. In automobiles, the cells are advantageously located in wheel wells, preferably in the two rear wheel wells.

Polyurethane is resistant to gasoline. It is light in weight, and the fuel cell prepared from it is much lighter in weight than a metal gas tank. In forming a cell or other article from it in liquid form, a liquid precursor is applied over a building form or within a mold by spraying, brushing, flowing, sloshing, dipping, or by filling a mold and then draining it, or shaping the liquid precursor of the polyurethane in any other manner. Fabric or film or the like can be included within or on the surface of the cell walls to give them strength, or for any other desired reason. Fuel permeability can be reduced by a film ply incorporated in or on the cell walls. A barrier of nylon, preferably applied as a liquid, has been found most satisfactory. The shaped material formed from the precursor is cured to produce the elastomeric fuel cell.

There are various advantages in forming a fuel cell from a liquid which is cured directly to its final shape. For instance, it eliminates the labor required to pretreat and impregnate a fabric with plastic (e.g. rubber, etc.), and there is no loss in scrap such as is produced when fabric plies are cut to shape. Also there is no inventory of treated fabric, such as is incident to forming cells of different sizes and shapes from cut fabrics, and no loss due to the necessity of scrapping imperfect fabric pieces.

The cell can be formed as a unit by applying the polyurethane precursor over a form made of cardboard, plaster or other frangible material which is subsequently destroyed within the cell after its completion, and removed through an opening, such as an opening for a fitting. In such an operation, the cost of the forms is high. If the shape of the cell adapts itself to formation over an inflated form, the form can be deflated and removed through one of the fitting openings. Cells to be used in wheel wells, are advantageously made in halves over a reusable form or within a reusable mold, and then sealed together. The invention will be described more particularly in connection with such an operation and product, but is not limited thereto. Reusable forms or molds of metal are preferable for such a process. A barrier of nylon or the like is advantageously included within or on the wall of each half cell, preferably applied as a liquid, to minimize or prevent diffusion of the fuel through the polyurethane, and the halves of the shaped precursor are separately cured, preferably after incorporation of the barrier in order to bond the nylon to the polyurethane as the latter is cured.

The polyurethane fuel cell must not be brittle because a frangible cell would not be safe. It is flexible, but preferably quite stiff so that it tends to hold its shape, although its walls must be held out to prevent collapse. If hit, it will flex without damage.

The polyurethane may contain plasticizer or other compounding ingredient. The tear strength should be at least 100 pounds per linear inch, and the tensile strength should be at least about 2000 pounds per square inch.

A satisfactory cell is obtained by curing the shaped polyurethane precursor at a temperature of up to 320° F., for example, with a diamine, such as any of the following:

| Technical Name | Trade Name | Source |
|---|---|---|
| 4,4'-Methylene-bis(2-chloroaniline) | MOCA | Du Pont.[1] |
| Diaminodiphenylsulfone | | |
| Diaminodiphenylamine | | |
| 4,4'-Diaminobenzophenone | | |
| Diaminopyridine | | |
| Meta-phenylenediamine | | |
| Cumenediamine and m-phenylenediamine | Curing Agent Z / DPI-7 | Shell.[2] |
| Liquid Polyamide | Versamid-100 | General.[3] |
| Do | Versamid-115 | Do.[3] |
| Do | Versamid-125 | Do.[3] |
| Hexamethylenetetramine | | |
| Triethylenetetramine | | |

[1] E. I. du Pont de Nemours and Company.
[2] Shell Chemical Corporation.
[3] General Mills Co.

Somewhat different temperatures may be preferred with different amines. Satisfactory properties are obtained with the du Pont precursor Adiprene L–100, using 8 to 30 parts of the diamine known as MOCA. A very satisfactory product is obtained by curing 100 parts of Adiprene L–100 with 11 parts of this diamine for about three hours at about 212° F.

Adiprene L–100 is a fully saturated polymer which contains 4.0 to 4.3 percent of isocyanate groups, by weight, the balance being at least largely a polytetramethylene ether glycol of medium chain length of about 30 or 40 oxygen atoms reacted with tolylene diisocyanate.

Likewise excellent properties are obtained with the du Pont precursor L–167. This is of like composition but contains 6.2 to 6.5 percent isocyanate content. It can be cured with about 20 parts by weight of the diamine known as MOCA.

Instead of being cured by the diamines discussed above, the precursor may also be cured by a polyol (castor oil, 1,4-butanediol, 1,2,6-hexanetriol, trimethylolpropane, triethanolamine, N,N,N',N'-tetrakis(2-hydroxypropyl)ethylenediamine, methyldiethanolamine and the like and combinations thereof), moisture, or miscellaneous catalysts, such as lead or cobalt naphthenate, potassium acetate, titanate esters, etc. As is well known in the art, the precursor can also be largely a linear polyester similarly terminated with a small percentage of isocyanate groups. Any of the variety of precursors known to the art can be used.

The invention is further described in connection with the accompanying drawings, in which:

FIG. 1 is a view in perspective of a finished fuel cell designed to fit in a wheel well;

FIG. 1a is an elevation of a tab such as used on the cell;

FIG. 2 is an enlarged fragmentary section through the cell wall;

FIG. 3 is an enlarged plan view of one of the fittings in the cell wall and the surrounding cell wall;

FIG. 4 is a sectional view taken along the line 4—4 of FIGURE 3;

FIG. 5 shows the cell in the wheel well of an automobile;

FIGS. 6 and 7 show the halves of the fuel cell from which the cell of FIGURE 1 was prepared, with the halves still on their forms;

FIG. 8 shows an inflatable form being removed from a cell; and

Figure 9:
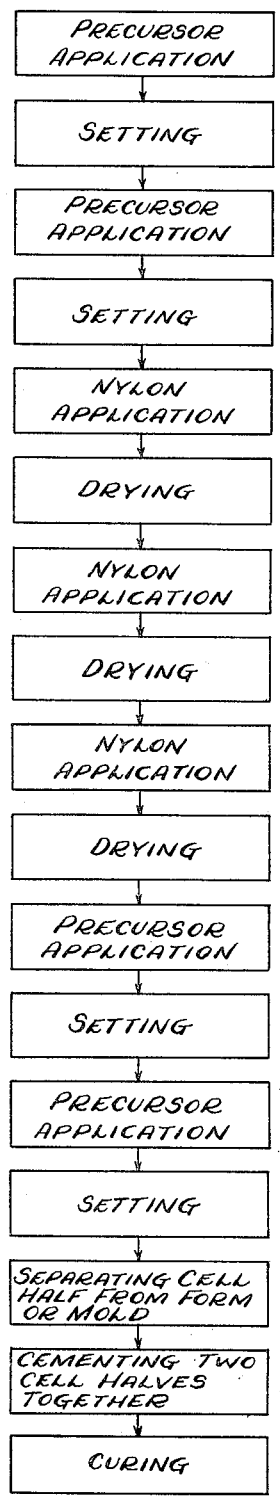
FIG. 9 is a flow sheet illustrating the manufacture of a cell.

The cell 5 shown in FIGURE 1 is designed to be located behind the left wheel of an automobile. The forward surface 6 is cylindrical (concentric with the wheel) and located against the housing, as illustrated in FIGURE 5. The bottom portion 7 of the fuel cell is smaller in area than the top portion to provide a substantially horizontal surface 8 to rest on a suitable support (not shown), and means for securing the cell in place will be provided, such as the tabs 9. They are of the usual type, each being provided with a usual loop. When the cell is in place in an automobile, these tabs alternate with metal hooks in the automobile structure, and the cell is held in place by running a suitable stringer through the loops and hooks.

Suitable fittings are provided in the top of the cell, as required. FIGURE 1 shows a gauge fitting 12 and a filler fitting 13. An enlarged view of the former is shown in FIGURE 3. They are incorporated in the cell wall in any suitable manner. For instance, the bottom ring of the fitting, with its exposed surface covered with cement, can be placed on the form before the first application of precursor, and then the top ring is cemented in place after the final application of precursor. Alternatively, the fitting can be prefabricated with two flexible flanges, and the cell wall can be built up between them. Fittings of different types can be used, installed in any convenient manner.

The gauge fitting 12 is composed of the nut ring 21 and top ring 22. The ring is generally of aluminum and includes a number of internally-threaded steel or aluminum nut inserts 24 assembled into it. If the cell is to be formed by spraying over a building form, the top of the form preferably will be recessed to receive the nut ring and the bottoms of the nut inserts.

There are several ways of assembling the ring in the cell. For instance: The ring 21 with the inserts is placed in a recess on the building form. The exposed surface, i.e. the top face is coated with a suitable adhesive 23. A composition containing a mixture in any suitable proportions of any polyurethane precursor, and any adhesive epoxy resin, bonds well to the polyurethane on curing, and also forms a firm bond with aluminum and steel or other structural metal. The following is illustrative:

| | Grams |
|---|---|
| Adiprene L–100 | 50 |
| Epon 828 [1] | 50 |
| Metaphenylenediamine | 10 |
| Solvent [2] to produce 50% solids. | |

[1] Epon 828 is a resin manufactured by Shell Chemical Co. It is the condensation product of epichlorhydrin and p,p′-isopropylidine diphenol (Bisphenol A).
[2] Either methylethyl ketone or a blend of 3 parts of the same with 1 part of toluene is satisfactory.

The precursor 25 is sprayed right over the adhesive-covered ring and the form, in several applications with partial or complete curing between the several coats.

The following method of building up a cell wall with a nylon barrier is not limited to a cell of any particular form or size, or to any particular form or mold on which it is fabricated. The description refers to sandwiching a nylon barrier between two laminae of polyurethane of the same thickness, but it is to be understood that the nylon can be located wherever it is protected from abrasion. The number of coats described for building up a particular wall thickness is suggestive, and may be varied as desired.

Although the nylon barrier may be applied as a preformed film, it is preferably prepared from a liquid composition of nylon or a nylon derivative. The nylon need not be pure condensation product of diamine and dicarboxylic acid, although essentially so, and suitable derivatives will suggest themselves to persons skilled in the art. A suitable formula follows:

| | Parts by weight |
|---|---|
| Nylon resin | 100 |
| Tributylamine | 7 |
| LX–1117 | 10 |
| Maleic anhydride | 4 |

Sufficient low molecular weight alcohol (ethyl and isopropyl alcohols being preferred) in water (3:1) to make a solution of 10% nylon content.

The nylon resin of the above formula is that produced by Belding-Corticelli Company of New York, and identified as their type 8-1-8. This is a terpolymer of hexamethylene adipamide, hexamethylene sebacamide and caprolactam in the weight ratio of 60/20/20, which has been methoxylated and thereafter treated with alkali. The tributylamine of the formula catalyzes the esterification of the maleic anhydride with the hydroxymethyl groups on the nylon to cross-link the same. The LX–1117 is a plasticizer also manufactured by Belding-Corticelli Company. The alcohol is a cheap solvent. Other low-boiling organic solvents, aqueous or non-aqueous can be used. By "low-boiling" is meant a solvent that will evaporate sufficiently rapidly under production conditions to be used commercially.

Other soluble nylons may be used. Those known as Du Pont type 6A and 6B and type 8 are satisfactory. The cross-linkable nylons (e.g. methoxylated and alkyleneoxide treated nylons) which react with the polyurethane precursor are used.

A suitable procedure for building up the cell wall is to first apply a precursor coat about 0.0025 inch thick. This may be a 50 percent solution of Adiprene L–100 and MOCA in a solvent blend of methylethyl ketone and toluene (3:1). Set this at room temperature or by heating as, for example, for 15 minutes at 220° F. Apply another such coat and set. This last coat should not be completely cured but should only be set sufficiently to prevent sagging, as the nylon coats to be described below will adhere to a partially cured polyurethane layer much better than to a fully cured layer—good adhesion of the nylon will be obtained in such case even in the absence of any priming coats which otherwise would be necessary. It is desirable to have the polyurethane precursor still retain some of its free isocyanate groups in order to interact chemically with the nylon by cross linking or otherwise.

Then apply one or more coats of nylon, e.g. three coats of the above nylon solution, and separately dry each to produce a coat of over-all thickness of about 0.001 inch thick. Two more coats of the precursor are then applied and each is set (as above). Heating is preferably used as the final step to hasten production. This must be long enough to cure, as by heating 3 hours at 212° F. Curing may be deferred until the fittings are in place, and all other operations involving the use of a curable composition have been performed, so that all may be cured simultaneously.

The ring 21 may be provided with several spacer areas 27 or the rings may be flat. The spacers, if used, provide a space of several hundredths of an inch (e.g. 0.040 inch) between the two rings for a layer of elastomer (or fabric, if used around the fittings). After the spray coats of precursor and nylon have been built to a thickness of about .040 inch, or slightly thicker, and before the final coat has been cured, the top ring 22, after cementing, is pressed into place. FIGURE 4 shows the two rings, nylon and precursor before the top ring or flange is pressed into position. Its undersurface is first coated with the foregoing adhesive. Other fittings, if any, are similarly assembled. Then the assembly is subjected to the final curing step, as by heating to about 212° F. for 3 hours.

The fittings may be bonded to the cell before the final curing of the precursor, or they may be bonded to the finished cell by a suitable adhesive. Alternatively, a tape or other fabric ply with suitable adhesive may be located between the two rings, with openings to accommodate the bosses 27, and cured into place between any two plies of the cell wall. The annular groove 28 is provided to accommodate an O-ring against which to clamp the cover of the fitting, or the exposed surface of the fitting can be coated with a suitable gasket to provide a sealing surface against which the cover is clamped.

A very practical method of producing a cell of the shape shown in FIGURE 1, is to make it in two halves, either over forms or within molds, and then adhere the halves together by suitable means. The line 30 of FIGURE 1 represents the line along which the two halves are cemented together. FIGURES 6 and 7 show two halves 35 and 36 built up on the forms 37. Although the drawings illustrate the spray nozzle 39 used to apply the precursor and nylon to the forms, it is to be understood that they may be applied by brushing or other means adapted to the application of liquid. Provisions will be made for fittings as required. The tabs 9 (FIGURE 1) are preferably applied to the halves while still on their forms.

The cell of FIGURE 1 is not of suitable shape to be made over an inflated form. Cells with curved walls may be made over such forms. FIGURE 8 is illustrative. The cell wall is formed by first applying liquid precursor, then nylon in solution, and then further precursor to build up the plies 45, 46 and 47. In the drawing, the wall is covered by fabric 49 to strengthen it, although such use of fabric is optional. The cell is built up on the form 50 when inflated. FIGURE 8 shows the form deflated and being removed through an opening in the cell. This may be an opening adapted to be provided with a fitting, or a special opening for removal of the deflated form which is subsequently patched.

FIGURE 9 is a flow sheet representing the operation more particularly described in which a cell is formed by sandwiching a nylon barrier (produced by three separate applications of nylon) between two plies of polyurethane (each formed by two applications of precursor). No nylon prime cement is required, such as is necessary in plying up a sheet of nylon barrier between sheet materials. Any suitable mold or form can be used which has a surface complementary to the whole or a part of the surface of a cell. Different precursors and different nylons can be used, and any number of applications can be made in any desired manner.

To illustrate, two molds or forms are provided for production of a cell such as shown in FIGURE 1. A hollow mold can be filled with the different solutions in series and then dumped; alternatively a form can be covered exteriorly by successively dipping into the solutions. The operation is described in connection with spring forms. The two forms shown in FIGURES 6 and 7 can be provided with means to suspend them from overhead tracks. The tracks would pass thorugh spray booths where the different liquids would be sprayed on to the forms automatically or by hand. After each nylon application each form would be passed through a drier, and after each precursor application it would be passed through a setting-up oven, except that the last heat treatment would be prolonged to cure the polyurethane. The same oven can be used for the two different types of operations. The forms may be attached to a conveyor which automatically moves them progressively through the different treating chambers, the time of treatment being varied by providing chambers of different lengths. The polyurethane halves after completion are trimmed and removed from the forms. It is desirable to locate fittings, etc. on the halves while they are still on the forms. The halves are then united. Any suitable adhesive may be used. It may be a mixture of polyurethane and epoxy resin, for example like the resin suggested for fastening the fittings to the cell, but there are many other adhesives that can be used. The curing treatment is advantageously delayed until after the fittings are in place and the halves have been united in order to cure the adhesives employed simultaneously with the curing of the polyurethane. Tabs, if employed, are conveniently applied to the cell halves while they are still on the form, and if a curable adhesive is used it will be cured simultaneously with the polyurethane. If the polyurethane is covered with fabric to strengthen it, the fabric is advantageously applied while the polyurethane is still on a form, and before curing. In that case, the fabric may be first treated with a curable adhesive which is cured simultaneously with the polyurethane.

The reference to fuel cells herein is to be construed to cover broadly fuel containers whether or not they are connected with an engine.

The drawings, formulae and specific examples are illustrative. The invention is covered in the claims which follow.

What we claim is:

1. The method of forming a fuel cell which comprises applying to a surface complementary to a wall of the cell, nylon and a liquid polyurethane precursor having a small percentage of isocyanate groups and thereby forming at least one continuous covering of each, and curing the precursor and removing the cured product from said surface.

2. The process of claim 1 in which the application of the nylon is sandwiched between applications of the polyurethane precursor, the prior application of the precursor being set by curing it only partially so that it retains some of its free isocyanate groups before application of the nylon and thereafter heating until both coverings of the precursor are cured completely.

3. The process of claim 1 in which fabric is applied over the outer polyurethane covering.

4. The method of producing a fuel cell which comprises covering a surface complementary to the wall of the cell with liquid polyurethane precursor, heating to set the precursor without completely curing the same, covering the set precursor with nylon in solution and then evaporating the solvent, covering the resulting nylon with liquid polyurethane precursor and thereafter simultaneously completing the cure of the two plies of precursor with the nylon between them, and after the precursor applied over the nylon has been set by simultaneous curing, as aforesaid, removing the set product from said surface.

5. The continuous process of producing a fuel cell which comprises applying liquid polyurethane precursor to each of two forms having surfaces complementary to two mating cell halves, heating each to set the precursor without completely curing the same, applying nylon in solution, evaporating the solvent, applying over the nylon a coating of liquid polyurethane precursor, and thereafter heating and simultaneously completing the cure of both plies of the precursor, and after the precursor applied over the nylon has been set by simultaneous curing, as aforesaid, removing the halves from the forms and adhering them to each other.

6. The method of building a fuel cell which comprises inflating a form to produce a surface complementary to the surface of the wall of the fuel cell, applying liquid polyurethane precursor to the inflated surface, and heating to set it without completely curing it, covering this with nylon in solution and removing the solvent, and applying thereover another ply of liquid polyurethane precursor, and thereafter heating and simultaneously completing the cure of both plies of polyurethane precursor, and then deflating and removing the form through an opening in the cell wall.

7. The method of producing a fuel cell which comprises producing two mating fuel cell halves on surfaces complementary thereto, by first applying polyurethane precursor to the surfaces, heating to set the precursor without completely curing it, covering the set precursor with nylon in solution and evaporating the solvent, then covering the nylon with liquid polyurethane precursor and heating to set the precursor; thereafter removing the set halves from the two forms and uniting them with a curable adhesive, and then heating to simultaneously cure the adhesive and complete the cure of both plies of the polyurethane precursor present in both of the halves.

8. The process of claim 7 in which a fitting is adhered to at least one of the halves by a curable adhesive while on the form and the adhesive is cured simultaneously with said other adhesive and while the cure of both plies of the precursor is completed.

9. The steps in the formation of a fuel cell which comprise forming adjacent plies of nylon and polyurethane precursor from liquid preparations thereof, and then heating to cure the precursor and simultaneously cross link some of the unsaturated linkages thereof with the nylon.

10. A fuel cell with plastic walls composed essentially of polyurethane containing a nylon barrier, which cell is adapted to be located under the fender near a wheel of an automobile, one end of the cell which is adapted to be near the wheel being curved substantially concentrically with the wheel, an outwardly extending substantially horizontal shelf portion between the top and bottom of the cell, which shelf portion extending the length of one side wall and the entire width of the opposite end of the cell joins a lower portion of the cell of lesser cross-sectional area with an upper portion of larger cross-sectional area and is adapted to rest on a cell support located under the fender of the automobile.

References Cited in the file of this patent

UNITED STATES PATENTS

| | | |
|---|---|---|
| 2,102,590 | Gray | Dec. 21, 1937 |
| 2,131,306 | Walker | Sept. 27, 1938 |
| 2,221,534 | Voit et al. | Nov. 12, 1940 |
| 2,345,977 | Howald et al. | Apr. 4, 1944 |
| 2,358,481 | Slack | Sept. 19, 1944 |
| 2,441,009 | Cunningham | May 4, 1948 |
| 2,563,981 | Walker | Aug. 14, 1951 |
| 2,594,979 | Nelson | Apr. 29, 1952 |
| 2,631,886 | Keller | Mar. 17, 1953 |
| 2,736,356 | Bender et al. | Feb. 28, 1956 |
| 2,758,845 | Doyle | Aug. 14, 1956 |
| 2,766,164 | Salem | Oct. 9, 1956 |
| 2,802,763 | Freedlander | Aug. 13, 1957 |
| 2,826,526 | Meyrick et al. | Mar. 11, 1958 |
| 2,884,978 | Grimm | May 5, 1959 |
| 2,891,876 | Brown et al. | June 23, 1959 |
| 2,945,262 | Petty | July 19, 1960 |
| 2,973,293 | Schofield | Feb. 28, 1961 |
| 2,999,764 | Rhoads | Sept. 12, 1961 |

FOREIGN PATENTS

| | | |
|---|---|---|
| 580,851 | Great Britain | Sept. 23, 1946 |